(12) United States Patent
Petito (10) Patent No.: US 11,553,826 B2
(45) Date of Patent: Jan. 17, 2023

(54) MANUAL WASHING SYSTEM, BUCKET AND MOP

(71) Applicant: Katia Petito, Casorate Primo (IT)

(72) Inventor: Katia Petito, Casorate Primo (IT)

( * ) Notice: Subject to any disclaimer, the term of this patent is extended or adjusted under 35 U.S.C. 154(b) by 72 days.

(21) Appl. No.: 17/271,632

(22) PCT Filed: Sep. 11, 2019

(86) PCT No.: PCT/IB2019/057634
§ 371 (c)(1),
(2) Date: Feb. 26, 2021

(87) PCT Pub. No.: WO2020/053770
PCT Pub. Date: Mar. 19, 2020

(65) Prior Publication Data
US 2021/0177233 A1 Jun. 17, 2021

(30) Foreign Application Priority Data

Sep. 13, 2018 (IT) .......................... 102018000008573

(51) Int. Cl.
*A47L 13/59* (2006.01)
*A47L 13/12* (2006.01)
(Continued)

(52) U.S. Cl.
CPC ............... *A47L 13/59* (2013.01); *A47J 47/18* (2013.01); *A47L 13/12* (2013.01); *A47L 13/22* (2013.01); *A47L 13/254* (2013.01); *A47L 13/58* (2013.01)

(58) Field of Classification Search
CPC .......... A47L 13/59; A47L 13/12; A47L 13/22; A47L 13/254; A47L 13/58; A47L 13/51; A47L 13/258; A47J 47/18
(Continued)

(56) References Cited

U.S. PATENT DOCUMENTS

| 2,605,492 | A | * | 8/1952 | Twerdahl | ................ A47L 13/58 |
| | | | | | D32/54 |
| 2,638,952 | A | * | 5/1953 | Sanderson | ............... B65D 7/26 |
| | | | | | 220/904 |
| 2,757,398 | A | * | 8/1956 | Richards | ............... A47L 13/146 |
| | | | | | 15/119.2 |

(Continued)

FOREIGN PATENT DOCUMENTS

CN 2635010 Y * 8/2004
CN 203354502 U * 12/2013
(Continued)

OTHER PUBLICATIONS

KR101047908B1 _Description_translation (Year: 2008).*
(Continued)

*Primary Examiner* — Orlando E Aviles
*Assistant Examiner* — Jacob Adam Montgomery
(74) *Attorney, Agent, or Firm* — Manelli Selter PLLC; Edward Stemberger (57) ABSTRACT

Manual washing system includes a bucket (2) provided with a base (10) and a lateral wall (12) having an upper rigid edge (11), and a mop (3) including a handle (4) associated to a head (5), the head (5) has a substantially plate-shaped body (50), the body (50) being associated to the handle (4) by a joint (6). The bucket (2) includes lateral wall (12) made of preformed plastic material with two or more successively foldable wall sections. The two or more wall sections are folded on the base (10), and the upper edge (11) is provided with a perimetral recess (14) and a locking element (15).

13 Claims, 5 Drawing Sheets

(51) Int. Cl.
*A47L 13/254* (2006.01)
*A47L 13/22* (2006.01)
*A47L 13/58* (2006.01)
*A47J 47/18* (2006.01)

(58) Field of Classification Search
USPC .............. 15/260, 264, 261, 262, 263
See application file for complete search history.

(56) References Cited

U.S. PATENT DOCUMENTS

| | | | | |
|---|---|---|---|---|
| 4,121,798 | A * | 10/1978 | Schumacher | B44D 3/123 |
| | | | | 24/336 |
| 5,440,778 | A * | 8/1995 | De Guzman | A47L 13/59 |
| | | | | 15/260 |
| 6,257,441 | B1 * | 7/2001 | Maley | A45F 3/16 |
| | | | | 220/326 |
| 6,374,867 | B1 * | 4/2002 | Maiuro | A47J 47/18 |
| | | | | 141/2 |
| 8,397,338 | B2 * | 3/2013 | Dihn | A47L 13/42 |
| | | | | 15/228 |
| 2006/0016031 | A1 * | 1/2006 | Llanes | A47L 13/14 |
| | | | | 15/264 |
| 2009/0235476 | A1 * | 9/2009 | Cioci | A47L 13/12 |
| | | | | 15/118 |
| 2014/0345075 | A1 * | 11/2014 | Chien | A47L 13/20 |
| | | | | 15/228 |
| 2015/0351604 | A1 * | 12/2015 | Li | A47L 13/38 |
| | | | | 15/209.1 |

FOREIGN PATENT DOCUMENTS

| | | | | |
|---|---|---|---|---|
| EP | 2713840 | B1 | 4/2014 | |
| EP | 2975988 | B1 | 1/2016 | |
| ES | 2099035 | B1 | 5/1997 | |
| GB | 2426691 | A * | 12/2006 | ............ A47J 47/18 |
| KR | 101047908 | B1 * | 8/2008 | |

OTHER PUBLICATIONS

CN2635010_description_translation (Year: 2004).*
CN203354502_description_translation (Year: 2013).*
International Search Report in PCT/IB2019/057634 dated Jan. 8, 2020.

* cited by examiner

MANUAL WASHING SYSTEM, BUCKET AND MOP

FIELD OF THE INVENTION

The present invention refers to a manual washing system comprising a bucket and a mop.

Prior Art

The washing system consisting of a bucket and a mop is still widely and advantageously employed as a cleaning system both for domestic environments, wherein the size of the areas to be cleaned does not justify other systems, and in work environments, due to the effectiveness of the obtained cleanliness.

As it is known, the shapes of the bucket and mop are optimal and advantageous for their respective use. However, such shapes are in contrast with the requirement of reducing the space and volume for stowing the bucket and mop. The bucket must be sufficiently spacious for containing the washing water for the cloth or the fabric strips associated to the mop head. The handle of the mop must be suitably long and easily handleable, comfortable and light so that it can be used by different types of persons and on different surfaces and paths.

The bucket, due to its shape, is generally used, in a non-operative condition, as a container. This is detrimental to the time required for using it in a second moment. Indeed, the contained objects must be removed and temporarily disposed in another place. While the mop with the fixed or movable head, associated to the long handle, is generally stowed far from the bucket.

Moreover, if a squeezing element, provided or not with a revolving unit, is associated to the bucket for squeezing the brush and/or the fabric strips associated to the mop head, the system has the same above described shortcomings.

A known solution is described in the Patent no EP2713840B1 of Arcasa S.r.l., it relates to a reducible bucket comprising a vertical portion of a flexible part intermediate and connected to two rigid parts; the vertical portion of the flexible part allows the translation of the first rigid part toward the second rigid part. A further solution is described in the Patent no ES2099035B1 of Di Francisco Munoz de Arenillas y Merino, it relates to improvements to floor scrubbing device. Another solution is described in the European Patent no EP2975988B1 of Arcasa S.r.l., it relates to a bucket with a lateral wall comprising rigid vertical portions welded and alternating to folding bellows portions.

Consequently, it is felt the need of providing a system enabling to orderly, quickly, and functionally stow the bucket and also the mop, simultaneously enabling to quickly and easily take both back to their cleaning functions.

It is also felt the need of having an adaptable system enabling to be implemented for any type and shape of mops and/or buckets.

The technical problem underlying the present patent application is that of devising and providing a manual washing system having structural and functional features which are such to optimally meet the required needs, overcoming in this way the drawbacks cited with reference to the prior art.

BRIEF SUMMARY OF THE INVENTION

The solution idea forming the basis of the present invention is that of providing a bucket-mop coupling enabling to reduce the overall non operative size without compromising the desired dimensions and volume capacity when they are used.

Based upon such a solution idea the technical problem is solved by a manual washing system comprising a bucket provided with a base and a lateral wall having a rigid upper edge, and a mop comprising a handle associated to a head characterized by the fact that said head comprises a substantially plate-shaped body, said body being associated to said handle by a joint, said bucket comprising said lateral wall made of a preformed plastic material which comprises two or more successively foldable wall sections, said two or more wall sections being foldable concentrically on said base (10), said upper edge being provided with a perimetral recess and a locking element, said perimetral recess being made towards the inner part of said bucket to define a housing seat, said locking element being adapted to lock said mop when the perimetral edge of said body is housed in said housing seat defined by said perimetral recess and said handle is coupled to said locking element.

Further preferred embodiments are described in the dependent claims.

The technical problem is solved also by a bucket made according to claim 12, and by a mop made according to claim 13.

The characteristics and advantages of the washing system according to the present invention will be understood by the description, given in the following, of an embodiment example thereof given only in an indicative and non-limiting way with reference to the attached drawings.

BRIEF DESCRIPTION OF THE DRAWINGS

In such drawings.

Figures from 5 to 8 show lateral schematic views of the system, according to the present invention, with the bucket in an intermediate position and in the closed position.

DETAILED DESCRIPTION

A manual washing system according to the present invention is generally shown in such figures. The system 1 comprises an assembly provided with a bucket 2 and a mop 3 associable to each other.

The mop 3 comprises a handle 4 extending along a main direction X-X. The handle 4 is associated to a head 5 by interposing a joint 6. The head 5 is defined by a substantially plate-shaped body 50 having a rectangular plan and adapted to be associated to a cloth 75 made of a synthetic fabric, for example of microfiber or cotton, or comprising fabric strips. The joint 6 is adapted to allow rotation of the handle 4 with respect to the body 50 of the head 5.

The bucket 2 is provided with a base 10 and a lateral wall 12 with an upper rigid edge 11. The lateral wall 12 is made of a layer of a foldable material and is provided with two or more successively foldable wall sections. The lateral wall 12 is made of a preformed plastic material, for example of silicone and is made by wall sections of a predetermined height, which are concentrically foldable on said base 10.

The bucket 2 has an operative position in which the lateral wall 12 is extended, and a closed position wherein the section walls of the lateral wall 12 are folded.

The upper rigid edge 11 comprises a perimetral recess 14 which is made towards the inner part of the bucket 2. The perimetral recess 14 is a housing seat and is adapted to house the perimetral edge of the body 50 of the head 5 of the mop 3.

A locking element 15 is associated to the upper rigid edge 11 for locking the mop 2 when the head 5 is housed in the perimetral recess 14. Consequently, the head 5 acts as a lid for the bucket 2 and can provide a complete or partial cover of the bucket 2 itself by housing on the overall perimetral recess 4 or at least a portion of the same.

Figure 3:
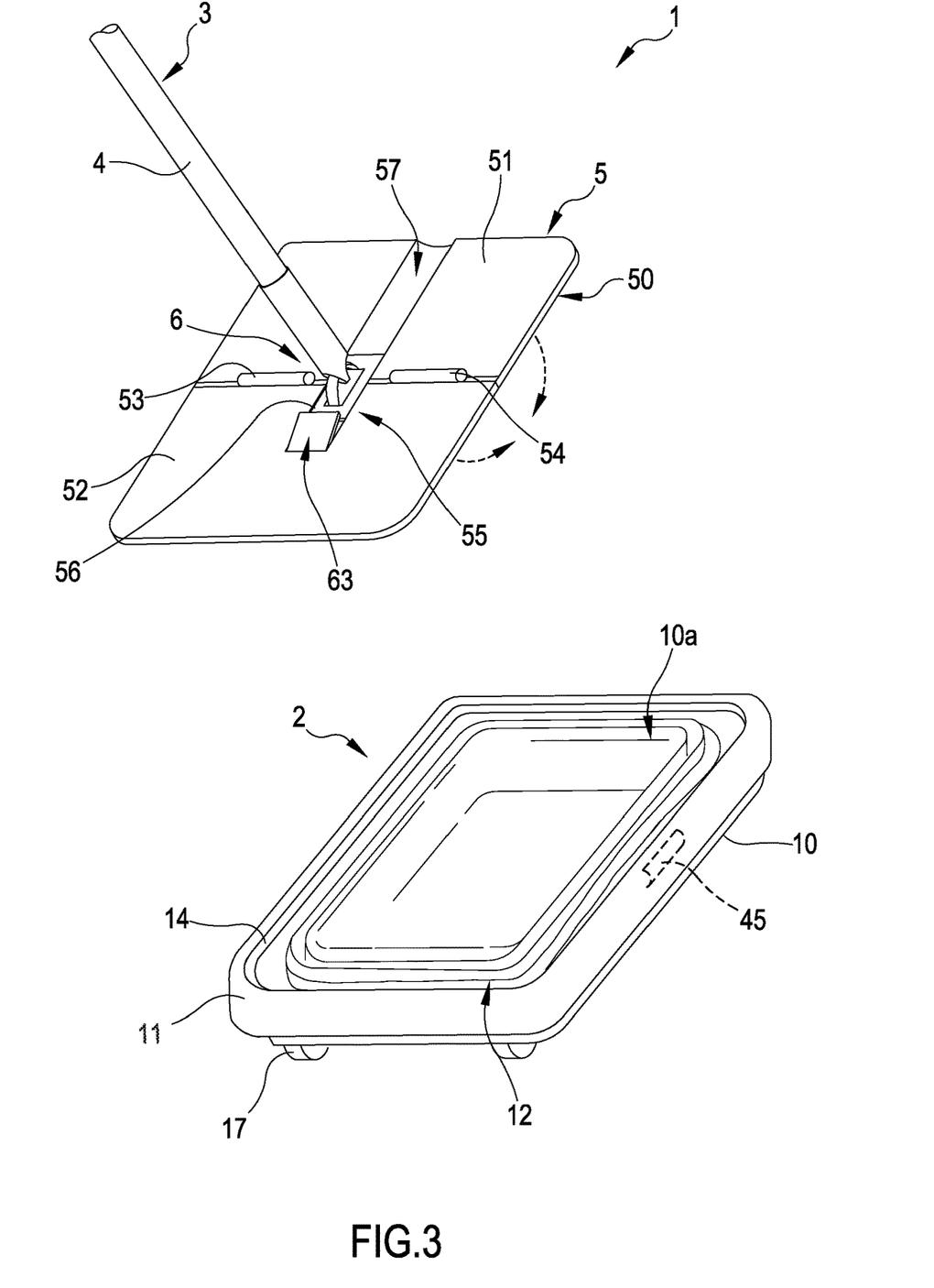
FIG. 3 shows a top schematic and perspective view of the system in FIG. 1 with the mop and bucket separated from each other, and the bucket in a closed position.
Figure 4:
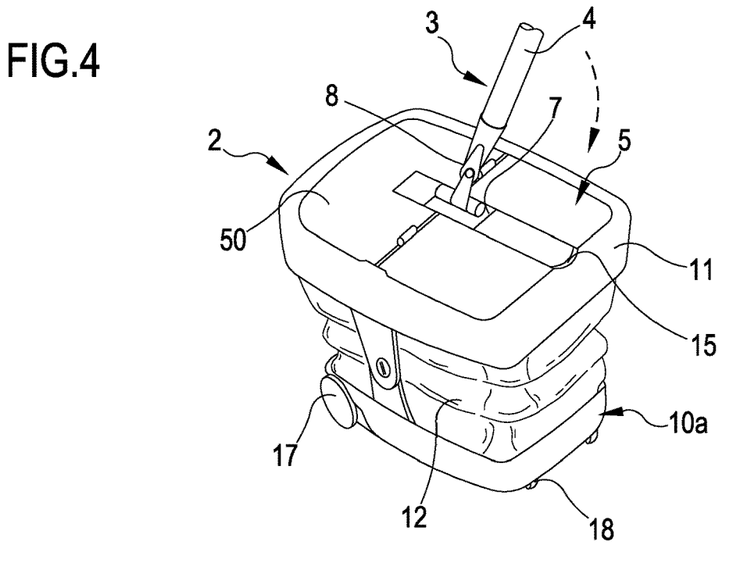
FIG. 4 shows a top schematic and perspective view of the system with the bucket in an operative position.
Figure 5:
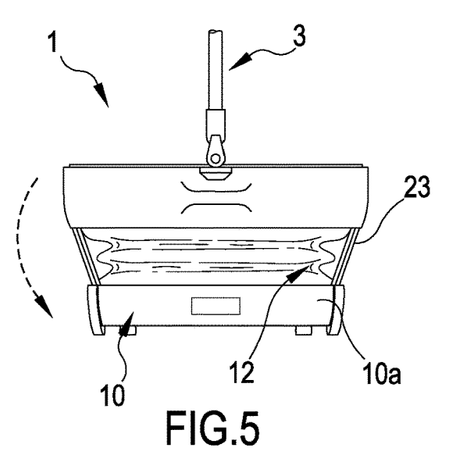
Figure 6:
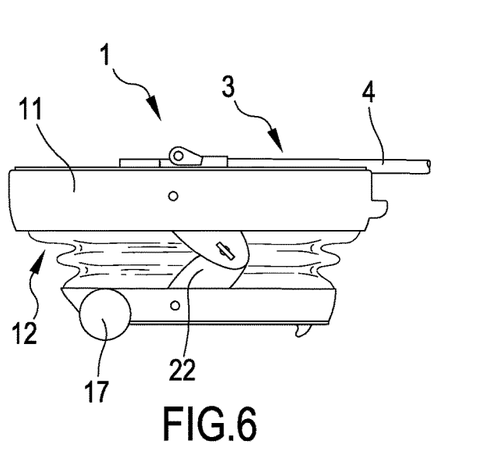

In an embodiment shown in FIG. 3, the body 50 has a substantially rectangular plan and comprises two body portions 51 and 52 hinge-connected by a pair of pivots 53 and 54 disposed along two respective corners. The two body portions 51 and 52 are open as a book in order to form the body 50 and are foldable by facing each other, for being inserted in the bucket 2.

An anchoring element 55, associated to a body portion 52, is provided with a strap 56 protruding from said body portion 51. The strap 56 is adapted to be coupled to a stop element 63 fixed in said other body portion 52 for making integral the two body portions 51 and 52, when they are open as a book. The strap 56 can be flexible or rigid and formed in a single piece with or is slidingly associated to the anchoring element 55.

Moreover, the anchoring element 55 has a hooking element 30, made as a band or a half-loop, adapted to be associated to the joint 6 of the handle 4 and adapted to enable the handle 4 to rotate with respect to the head 5.

The body 50 has, on the upper surface thereof, a valley or channel 57, adapted to at least partially house a handle 4 portion when the handle 4 of the mop 3 is rotated with respect to the head 5 to the closed position.

The upper edge 11 of the bucket 2 comprises a locking element 15 disposed at the channel 57 when the head 5 is housed in the housing seat 14.

In an embodiment, the locking element 15 is shaped as an open loop, with flexible end portions and/or made of silicone and provided with one or more holding bands for temporarily locking the handle 4.

The bucket 2 has the base 10 with a plan whose dimensions are smaller than the dimensions of the upper edge 11 of the lateral wall 12.

A first and second pairs of rods, 22 and 23, are disposed facing each other outside the lateral wall 12. The rods of each pair of rods, 22 and 23, are pivoted to each other and are respectively constrained to a perimetral edge 10a of the base 10 and to the upper edge 11. The rods of each pair of rods 22 and 23 are deployed for holding the lateral wall 12 extended and are folded by facing each other and are disposed between the perimetral edge 10a of the base 10 and the upper perimetral edge 11, when the lateral wall is folded, as schematically shown in Figures from 5 to 8.

In a further embodiment, the first and second pairs of rods 22 and 23 can be made by a plunger or a spring element or similar.

Moreover, each pair of rods 22 and 23 can have at least one further intermediate stable position adapted to hold the upper edge 11 in an intermediate work position. In this case, the capacity of the bucket 2 is reduced with respect to the obtainable maximum capacity which is achieved when the lateral wall 12 is completely extended.

Moreover, the base 10 comprises a pair of wheels 17 and a pair of feet 18 associated to and downwardly protruding from it, preferably disposed in proximity of the four corners, adapted to easily move the bucket 2.

A draining opening 45 with a sealing plug, is provided at the perimetral edge 10a of the base 10, for enabling to quickly and easily empty the washing liquid contained in the bucket 2.

In an embodiment, the mop 3 has the joint 6 with a fixed element 7 associated to the head 5 and a movable element 8 pivoted to the fixed element 7. The movable element 7 is associated to the handle 4 for enabling the handle 4 to rotate until overlapping the head 5 so that it is received in the channel 57. Consequently, the joint 6 enables the handle 4 to rotate with respect to the head 5 according to a plane normal to a plane comprising the two body portions 51 and 52, opened as a book.

The joint 6 enables to fix the handle 4 in one or more work conditions wherein the axis X-X of the handle 4 is disposed with a predetermined angle with respect to the plane comprising the head 5.

Therefore, the so-obtained system 1 has at least two operative positions: a work position wherein the bucket 2 is disposed with the lateral wall 12 extended and the mop 3 detached from the bucket 2, and a closed position wherein the lateral wall 12 is folded and the mop 3 is associated to the bucket 2 with the head 5 housed in the perimetral recess 14 and the handle 4 is rotated and housed in the channel 57 locked by the locking element 15.

Figure 7:
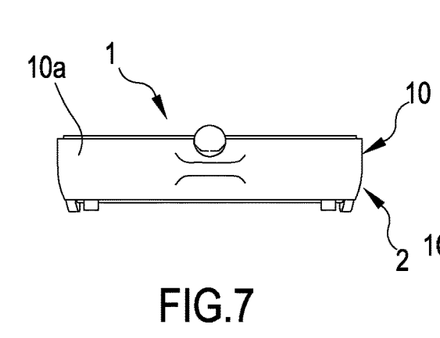
Figure 8:
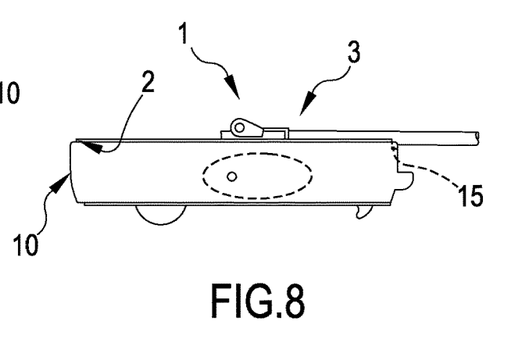

In the closed position, the system 1, bucket 2 and mop 3 have an extremely limited volume and size whose depth is substantially determined by the height of the bucket 2 in the closed position (FIGS. 7 and 8). In the work position, the bucket 2 is restored to the required volume by simple and fast operations by acting on the pair of rods 22 and 23. Consequently, the lateral wall 12 returns to the extended shape, while the mop 3 returns to its operative position by unhooking the handle 4 from the locking element 15 and pulling out the head 5 from the perimetral recess 14. The handle 4 could be of a telescopically extendable type for further reducing the volume in the closed position of the system 1.

Some details regarding the bucket-mop system can be made according to variants. In an embodiment, the bucket 2 can comprise the lateral wall 12 made of a layer of a waterproof material, such as for example a non-woven fabric or PVC or similar.

In an embodiment variant, the head 5 can have suitable hooking elements disposed at the upper or lower surface for connecting a cloth of fabric or microfiber or for connecting a plurality of fabric strips, for example of a system known as "swab". In this latter case, the head 5 of the mop 3 can have limited dimensions in order to occupy just a single portion of the perimetral recess 14. The remaining space of the perimetral recess 14 is adapted to possibly house other elements for squeezing the fabric strips associated to the head 5.

Figure 9:
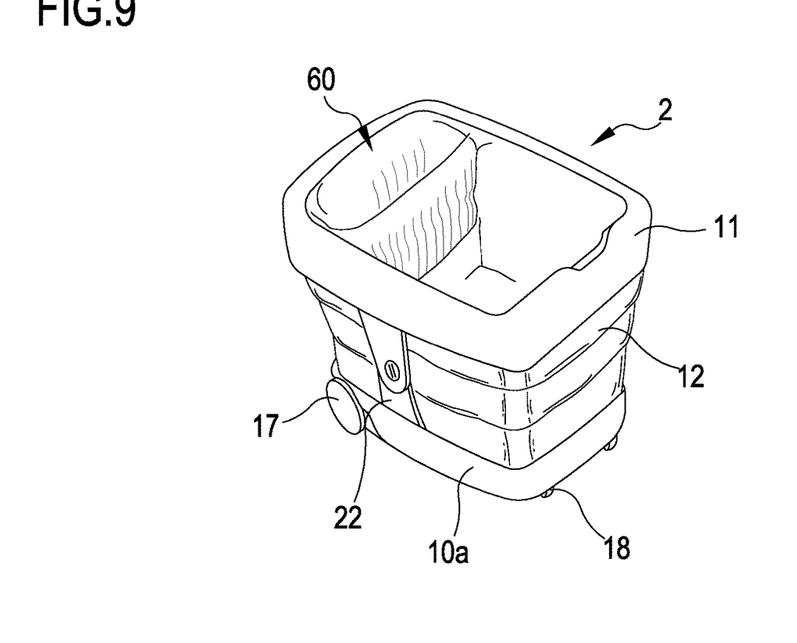
FIG. 9 shows a top schematic and perspective view of a bucket in a second embodiment.
Figures 10, 11:
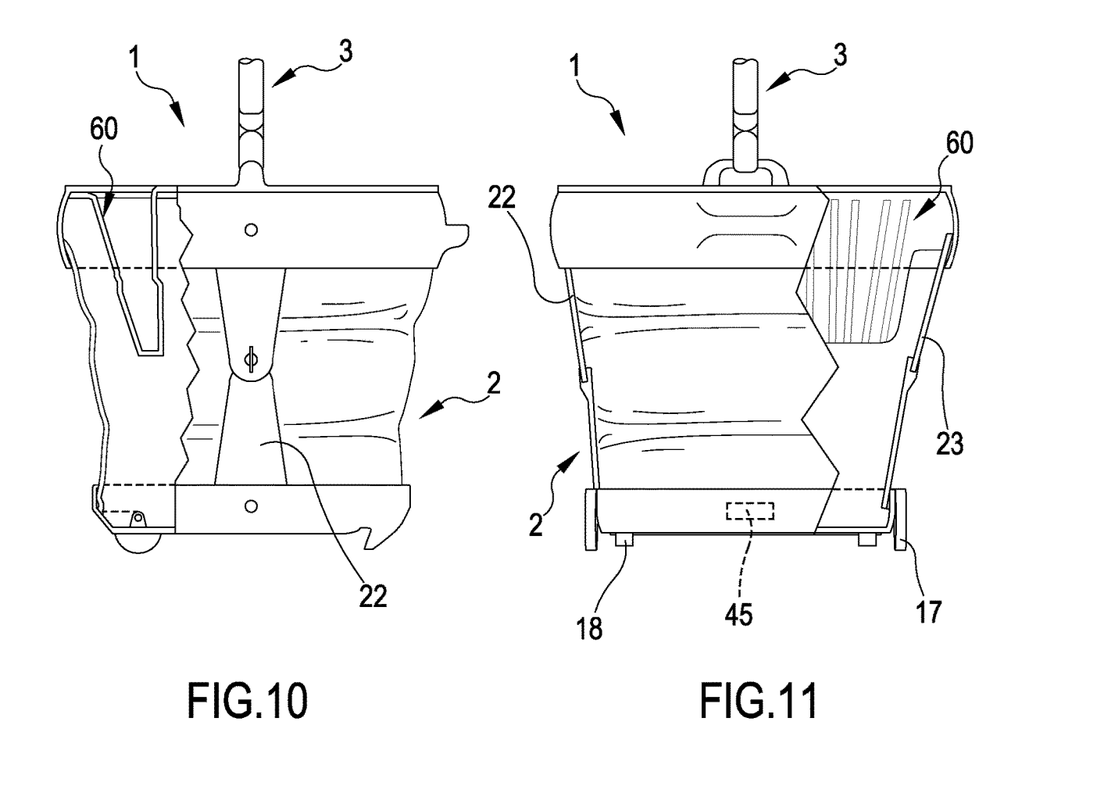
FIGS. 10 and 11 show lateral views with cross-section portions drawn by a broken line, of the system with the bucket of FIG. 9.
Figure 12:
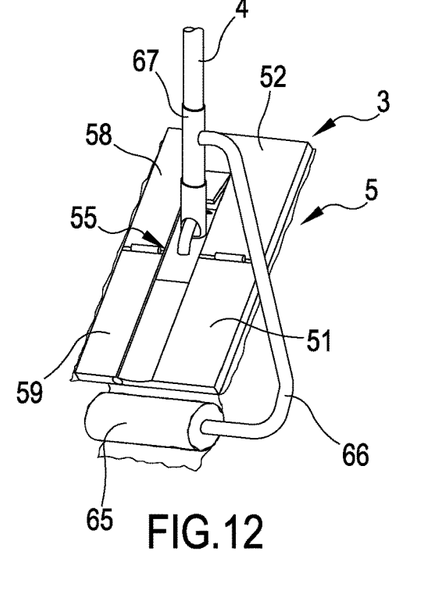
FIGS. 12 and 13 show a top perspective view and a lateral view of a mop of a further embodiment.
Figure 13:
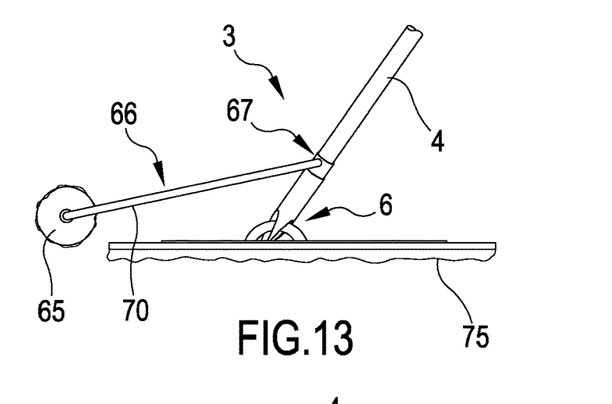
Figure 14:
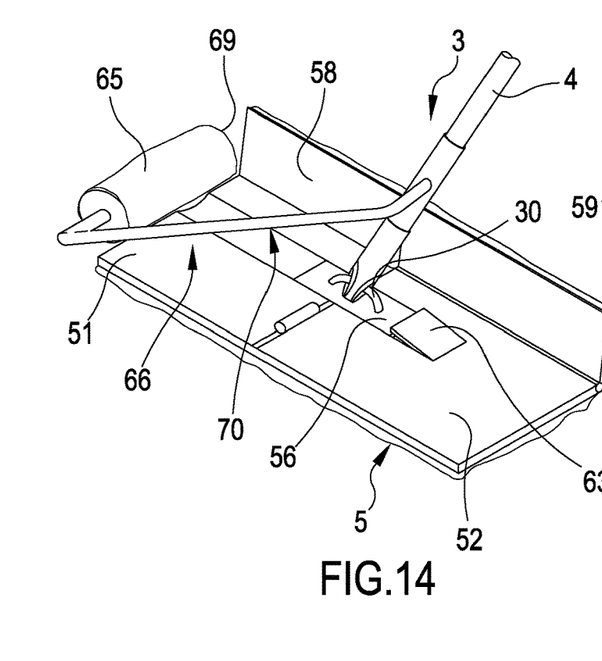
FIGS. 14 and 15 show the mop of FIG. 12 in two different positions, respectively in an operative position and in a closed position.
Figure 15:
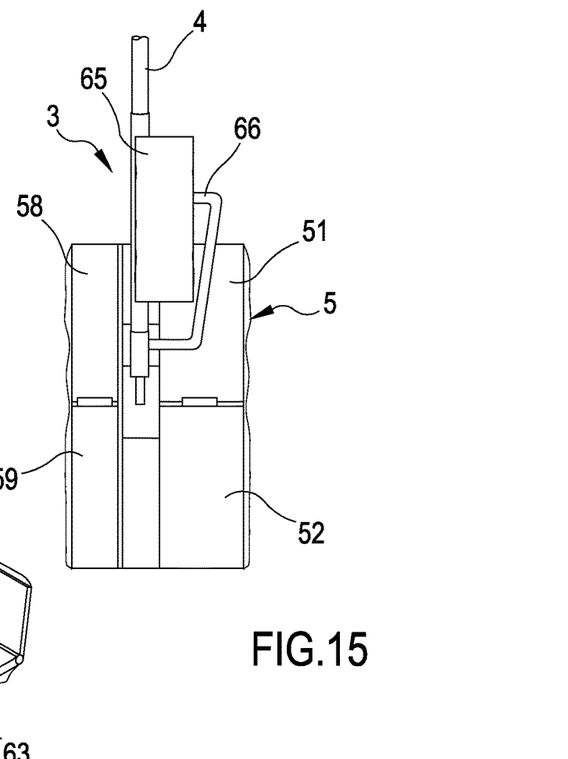

As schematically shown in Figures from 9 to 11, a squeezer 60 is associated to the upper edge 11 of the bucket 2 in the operative position. The squeezer 60 can be manual or actuated by a pedal and can have different shapes. Preferably, the squeezer 60 is made of a preformed plastic material, for example of silicone, and comprises two or more successively foldable wall sections. Consequently, the system 1 in the closed position has the squeezer 60 having a depth equal to the height of the bucket 2 in the closed position.

In the embodiment shown in Figures from 12 to 15, the mop 3 has the head 5 with the body portions, 51 and 52, provided with a movable lateral part, respectively 58 and 59. Each movable lateral part, 58 and 59, is connected to the respective body portion, 51 and 52, substantially as a hinge by further pivots and/or bands of a flexible material. Therefore, each movable lateral part 58 and 59 is foldable, in other words can rotate towards the handle 4 for cleaning particular elements, such as skirting boards or similar.

The mop 3 can also have a roller 65 associated to the handle 4 by a spacer 66 with a rigid support. The spacer 66 has an end coupled to the handle 4 by a sleeve 67 and an opposite end comprising a freely rotating tubular element 68. The roller 65 is inserted in the tubular element 68 and can comprise a microfiber cloth 69, which is suitably associated by hooking elements of the male-female type, for example made of Velcro®.

The spacer 66 comprises a rod 70 with an end freely associated to the sleeve 67 in order to enable the same to rotate with respect to a plane comprising said body of said head 5 in order to enable to selectively position the roller 65. The roller 65 can have a first position in front of each body portions 51 and 52, when the mop 3 is in the work position and the rod 70 is in proximity of the floor. Or, the roller 65 can have a second position when the mop 3 is in the closed position and the rod 70 is in proximity or associated to the handle 4.

For example, the roller 65 can be used for initially wetting the surface to be cleaned.

Figure 1:
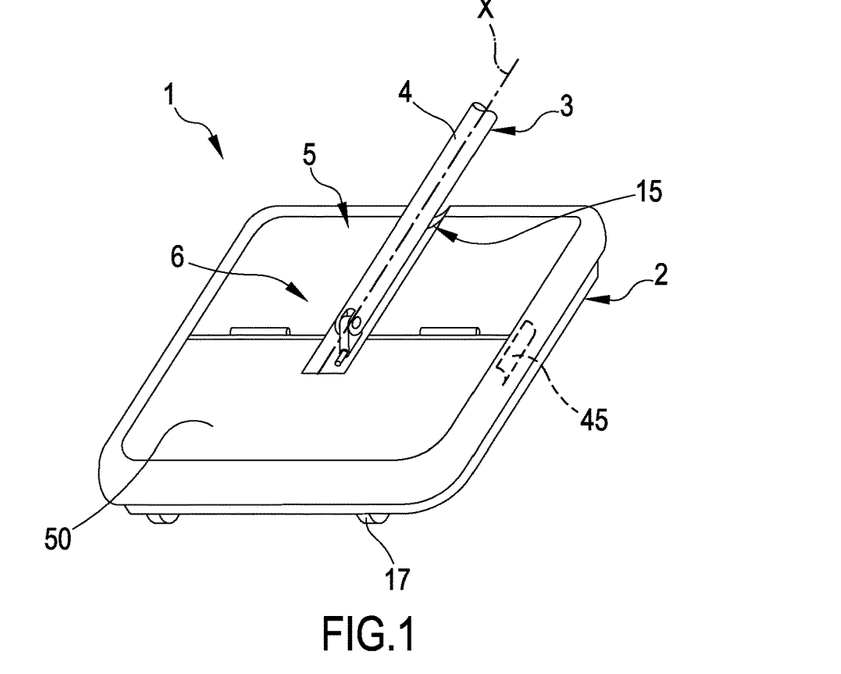
FIGS. 1 and 2 show top perspective schematic views of a system in a closed position, made according to the present invention.
Figure 2:
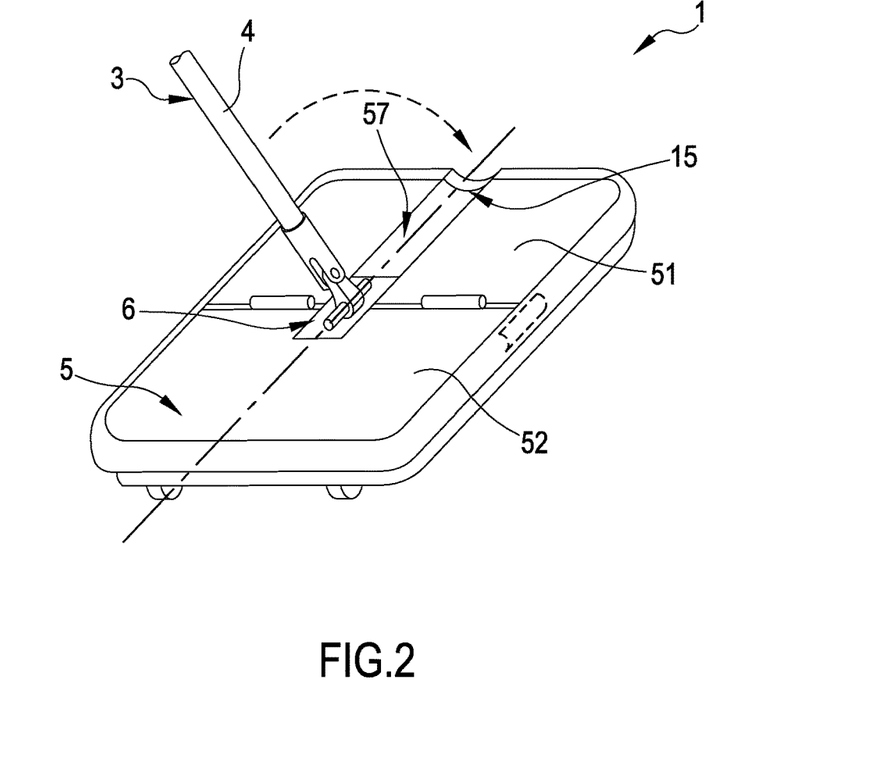

In a further embodiment, the mop 3 can comprise the joint 6 made of a first element adapted to be connected to the body 50 and a second rotation element adapted to be associated to the handle 4, as shown for example in FIGS. 1 and 2.

It is observed that the so devised system has met the task and the prefixed objects in that the same has an extremely limited volume in a closed position. Furthermore, the closed position of the system is simply and quickly obtained by the reduced volume bucket, due to the folded lateral wall, and with the mop hooked to the bucket having the cover head housed in the housing seat of the bucket and the handle hooked to the upper edge. In the same way, the system can be quickly put back to the work position, for cleaning operations, maintaining the standard volumes.

The system and in particular the bucket and the mop are also manufacturable at a low cost.

The invention claimed is:

1. Manual washing system (1) comprising:
a bucket (2) provided with a base (10) and a lateral wall (12) having an upper rigid edge (11), and
a mop (3) comprising a handle (4) coupled to a head (5), wherein said head (5) comprises a substantially rectangular body (50), said body (50) being coupled to said handle (4) by a joint (6), said bucket (2) comprising said lateral wall (12) made of preformed plastic material which comprises two or more successively foldable wall sections, said two or more wall sections being folded concentrically on said base (10), said upper rigid edge (11) being provided with a substantially rectangular perimetrical recess (14) and a locking element (15), said perimetrical recess (14) being made towards an inner part of said bucket (2) to define a perimetrical housing seat, said locking element (15) being adapted to lock said mop (3) when the entire perimetrical edge of said body (50) is housed in and engaged with an entirety of said perimetrical housing seat defined by said perimetrical recess (14) such that said head (5) is configured to act as a lid for said bucket (2), and when said handle (4) is coupled to said locking element (15).

2. The system according to claim 1, wherein said lateral wall (12) is made of silicone and/or of a layer of a material comprising a non-woven fabric or PVC, and that said wall sections have a predetermined height.

3. The system according to claim 1, wherein said body (50) has a substantially rectangular plan and comprises two body portions (51, 52) hinge-connected by a pair of pivots (53, 54) disposed along two respective corners.

4. The system according to claim 3, further comprising an anchoring element (55) which is provided with a strap (56) and is coupled to one of said two body portions (51, 52) and is adapted to be coupled to a stop element (63) which is coupled to said other body portion (52), said anchoring element (55) comprising a hooking element (30) adapted to be coupled to said joint (6) of said handle (4), said hooking element (30) being adapted to rotate said handle (4) with respect to said head (5).

5. The system according to claim 1, wherein the plan dimensions of said base (10) of the bucket (2) are smaller than the plan dimensions of said upper edge (11).

6. The system according to claim 1, wherein the bucket (2) further comprises first and second pairs of rods (22, 23) facing each other and outside said lateral wall (12), said first and second pairs of rods (22, 23) being constrained respectively to an outer edge (10a) of said base (10) and to said upper rigid edge (11).

7. The system according to claim 1, wherein said bucket (2) further comprises a pair of wheels (17) and a pair of feet (18) coupled to and projecting below said base (10), said base (10) being provided with a draining opening (45) with a sealing plug, provided in proximity of a lower outer edge (10a).

8. The system according to claim 1, wherein said bucket (2) comprises a squeezer (60) coupled to said upper rigid edge (11), said squeezer (60) being made of a preformed plastic material comprising two or more successively foldable wall sections.

9. The system according to claim 1, wherein said head (5) comprises said body (50) having at least one movable lateral part (58, 59) substantially hinge-connected by pivots and/or bands of a flexible material, said at least one movable lateral part (58, 59) being adapted to be folded towards said handle (4).

10. The system according to claim 1, wherein said mop (3) further comprises a roller (65) coupled to said handle (4) by a spacer (66) with a rigid support, said spacer (66) exhibiting an end coupled to said handle (4) by a sleeve (67) and an opposite end comprising a freely rotating tubular element (68) adapted to support said roller (65).

11. The system according to claim 1, wherein, the system is constructed and arranged such that in an operative position, said lateral wall (12) of said bucket (2) is extended and said mop (3) is decoupled from said bucket; (2) and a closed position wherein said lateral wall (12) is folded on said base (10), and said head (5) of said mop (3) is housed in said perimetrical recess (14) and said handle (4) is locked by said locking element.

12. A bucket (2) comprising:
    a base (10), and
    a lateral wall (12) with an upper rigid edge (11),
    wherein said lateral wall (12) is made of a preformed plastic material with two or more successively foldable wall sections, said two or more wall sections being folded concentrically on said base (10), said upper edge (11) is provided with a perimetrical recess (14) and a locking element (15), said perimetrical recess (14) extending towards an internal part of said bucket (2) to define a perimetrical housing seat, said perimetrical housing seat being adapted to receive and engage an entire perimetrical edge of a body (50) of a head (5) of a mop (3) and said locking element (15) being adapted to lock a handle of a mop (3).

13. The bucket of claim 12 in combination with the mop (3), the handle (4) being coupled to the head (5),
    wherein said body (50) is substantially rectangular and is coupled to said handle (4) by a joint (6), said joint (6) being adapted to rotate said handle (4) with respect to said body (50),
    wherein, when the entire perimetrical edge of said body (50) is housed in and engaged with an entirety of said perimetrical housing seat, said head (5) is configured to act as a lid for said bucket (2).

* * * * *